Feb. 27, 1951 A. GHILLANY 2,543,625
FLEXIBLE TOOL FOR APPLYING ANTISKID CHAINS TO TIRES
Filed March 6, 1946
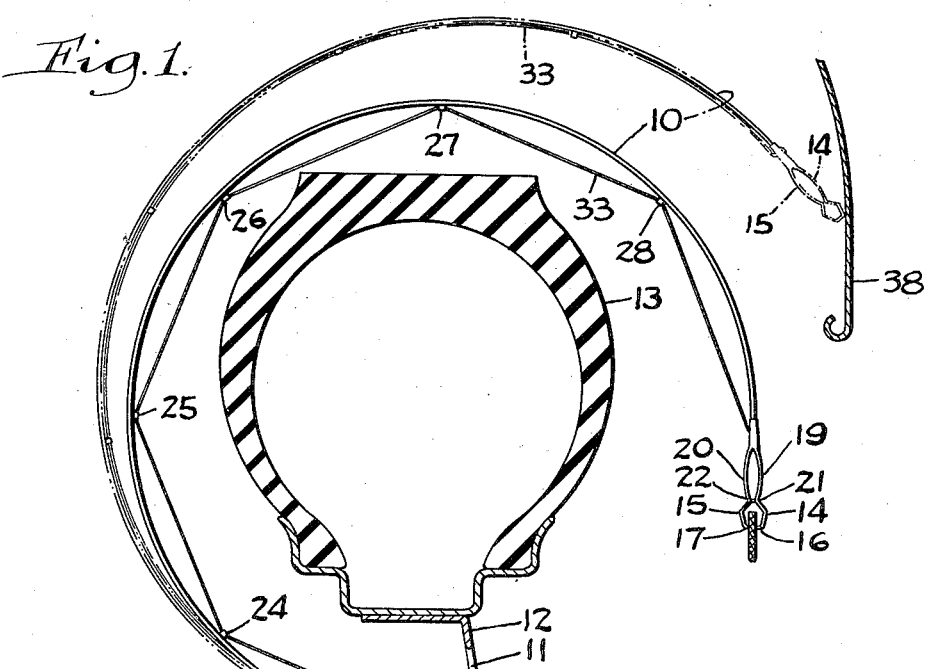
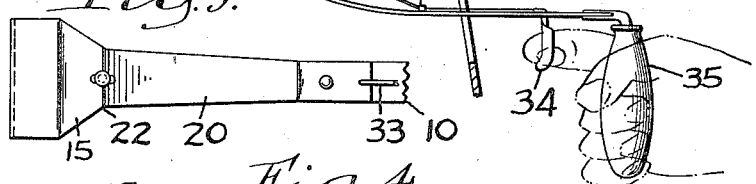
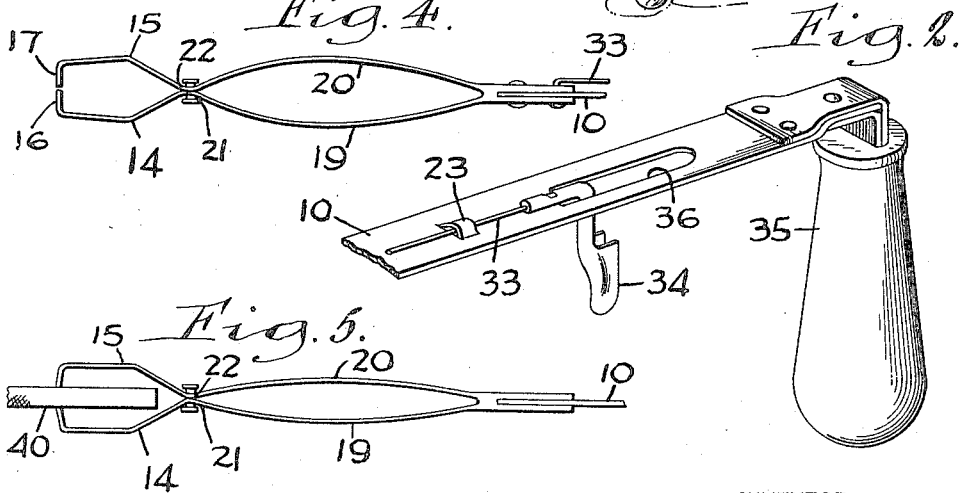
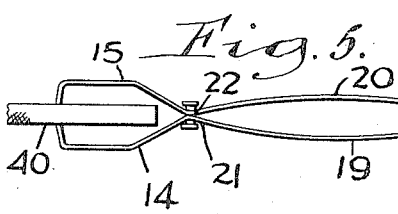
INVENTOR
Anthony Ghillany
BY
Beau, Brooks, Buckley & Beau
ATTORNEYS Patented Feb. 27, 1951

2,543,625

UNITED STATES PATENT OFFICE 2,543,625

FLEXIBLE TOOL FOR APPLYING ANTISKID CHAINS TO TIRES

Anthony Ghillany, Buffalo, N. Y., assignor of one-fourth to William N. Nushawg, East Aurora, and one-fourth to James J. Lichtenthal, Eggertsville, N. Y.

Application March 6, 1946, Serial No. 652,355

1 Claim. (Cl. 81—15.8)

This invention relates to a device for facilitating the application of anti-skid devices to vehicle wheels.

The matter of positioning and securing chains and other anti-skid devices to vehicle wheels has always been cumbersome and vexatious. It is generally done under bad weather conditions and modern streamlined vehicle body and fender designs have complicated the operation by rendering the vehicle wheels less and less accessible.

A common form of anti-skid device is the kind wherein individual loops are separately fastened about the rim and tire of a vehicle wheel, part of the loop extending through one of the relatively small openings conventionally found just inside the rim of the wheel. This type is commonly referred to as a mud hook and comprises a length of chain having a strap device at opposite ends of the chain which are adapted to be buckled together to secure the device about the rim and tire with the chain portion exposed at the tire tread surface. The openings just inside the rims of modern vehicle wheels, through which devices of this kind must be threaded in applying them, are relatively small.

Further, after one end of an opened chain of this kind is inserted through such opening, it must be brought up across the inner sidewall of the tire, outwardly across the tread surface, and downwardly to meet the other end of the chain device for securement thereto. The extent to which the wheels of modern automotive vehicles are covered by their fenders makes the operation much more difficult and awkward than might otherwise be the case. Further, chains of this kind are usually applied in emergencies when the user is not attired for work of this kind, with the result that clothing is soiled and often ruined in the process.

The present invention provides a flexible tool which adapts itself readily to the operation of applying an anti-skid device to a vehicle wheel without the necessity for reaching behind or about the wheel or tire in any manner. The novel tool is merely inserted through the wheel opening and caused to extend upwardly and outwardly across the tire tread and downwardly a distance sufficient to form a closed loop, if desired. This operation of the novel tool of the present invention is accomplished entirely by manipulation from outside one of the aforementioned holes in the vehicle wheel.

When the tool has been thus caused to extend completely about the wheel rim and the tire, one end of an anti-skid device is secured to the free end of the tool and operation of the tool is merely reversed to unthread it from the hole in the vehicle wheel. During this operation, the anti-skid device is drawn upwardly between the fender and the outer side wall of the tire, inwardly across the tire tread, downwardly, and out through the opening in the vehicle wheel. The end of the anti-skid device may then be separated from the tool and the two ends of the anti-skid device secured to each other in the usual manner.

The following description and the accompanying drawing illustrate one form of the device of my invention by way of example but it is to be understood that many mechanical variations may be effected and devised without departing from the underlying principles of the invention. The spirit and scope of my invention are not limited excepting as defined in the appended claim.

In the drawings:

Fig. 1 is a transverse cross-sectional view through a vehicle wheel rim and tire showing a general elevational view of one form of the device of my invention in operation;

Fig. 2 is a fragmentary perspective view of the handle and control end of the tool of Fig. 1;

Fig. 3 is an enlarged fragmentary elevational view of the opposite end of the tool of Fig. 1, viewed at right angles to Fig. 1;

Fig. 4 is a further enlarged fragmentary elevational view of such opposite end viewed at right angles to Fig. 3; and Fig. 5 is a view similar to Fig. 4 but with an end of an anti-skid device being gripped thereby.

Throughout the several figures of the drawing like characters of reference denote like parts and, referring to Fig. 1, the numeral 10 designates a resilient band or rod which comprises the main body of the applying tool illustrated by way of example and in its free state assumes approximately the form shown in dot and dash lines, or even a more open form. In any event, the rod 10 is sufficiently flexible so that the loop illustrated in Fig. 1 may readily be opened to facilitate projecting an end of the device through an opening 11 in a vehicle wheel 12. In Fig. 1 the numeral 13 indicates a conventional pneumatic tire. It is to be understood that rod 10, while illustrated as a flat band, may be a circular rod of spring wire or the like.

The outer or free end of rod 10 has riveted, welded, or otherwise secured thereto a pair of resilient clamp elements 14 and 15 which may terminate in clamping flange formations 16 and 17 respectively for resiliently clamping the strap end of a mud hook or similar anti-skid device. The meeting edges of the clamp formations 16 and 17 are preferably provided with interfitting saw tooth edges not shown in the drawings. The toothed portions 16 and 17 are separated for the purpose of inserting a strap end of a mud hook therebetween by manually pressing the outwardly formed portions 19 and 20 of clamps 14 and 15 toward each other, whereupon the toothed formations 16 and 17 separate by pivotal movement about a fulcrum formed by inwardly bent portions 21 and 22 of the parts 14 and 15.

Rod 10 is provided with a series of loops 23 through 28 which are struck from the body of band or rod 10 as clearly shown in Fig. 2. However the loops along rod 10 may be fixed thereto by welding or otherwise in such a way as to provide a series of openings or eyes at the inner side of rod 10. A pull wire 33 extends through the openings formed by the several loops and may be secured at one end directly to the clamp elements 14 and 15. Pull wire 33 terminates at its opposite end in a trigger 34 or other gripping formation. The adjacent end of rod 10 is provided with gripping or handle means 35 and for convenience in manipulating the tool trigger 34 extends through a slot 36 formed in rod 10 so that handle 35 and trigger 34 are more directly opposed.

When the device is grasped by handle 35 and the pull wire 33 is drawn toward handle 35 by manipulation of trigger 34, the curvature of rod 10 is made more abrupt and rod 10 may thus be caused to extend entirely about the rim portion of wheel 12 and the associated tire 13, without interference from the fender indicated at 38 in Fig. 1. When it is in contracted position, rod 10 assumes the form indicated in full lines in Fig. 1. A cord or other flexible tension member may be substituted for the flexible pull wire 33 and various forms of grasping devices for both rod 10 and pull wire 33 may be provided within the spirit of the present invention. Likewise, the specific clamping means for engaging the end of a skid chain or mud hook may be varied.

After the rod 10 is contracted to the position shown in dot and dash lines in Fig. 1 an end of a mud hook strap is engaged between clamps 14 and 15, as shown at 40 in Fig. 5, and handle 35 is merely moved continuously away from wheel 12, manipulation of pull wire 33 being simultaneously controlled by means of trigger 34 so that the degree of curvature of rod 10 is controlled to effect ready withdrawal thereof through the opening in wheel 12, where such manipulation is necessary. In general, after an end of a skid chain is engaged by clamps 14 and 15, pressure on trigger 34 may be released, so that the limiting confines of the interior of the fender will provide the only limitation on opening of the loop formed by rod 10. In any event, when rod 10 is fully withdrawn from opening 11 in wheel 12, one end of the skid chain device will have been brought through the opening 11 and may then be unclamped and buckled or otherwise connected to the opposite trailing end of an anti-skid device in the usual manner.

What is claimed is:

A tool for applying anti-skid devices about the rims of vehicle wheels, said tool comprising a resilient strip-like element, a control element comprising an elongate flexible element fixed to said strip-like element adjacent one end thereof, bearing means disposing said flexible element to extend generally parallel to said strip-like element at one side thereof, the opposite unsecured ends of said strip-like element and said flexible element comprising manipulating portions whereby a lengthwise pull on the flexible element relative to the strip-like element causes the latter to be flexed into a curved position with the sharpness of curvature increased selectively by intensifying the pull on the flexible element, and means secured to the fixed ends of said elements for engaging a portion of an anti-skid device to permit the same to be drawn about a vehicle rim and tire by manipulation of said tool.

ANTHONY GHILLANY.

REFERENCES CITED

The following references are of record in the file of this patent:

UNITED STATES PATENTS

| Number | Name | Date |
|---|---|---|
| 419,635 | Butts | Jan. 21, 1890 |
| 1,056,084 | Bates | Mar. 18, 1913 |
| 2,234,902 | Keppel | Mar. 11, 1941 |
| 2,257,657 | Spahr | Sept. 30, 1941 |
| 2,407,331 | Van Velzer | Sept. 10, 1946 |